(12) United States Patent
Williamson

(10) Patent No.: US 11,930,326 B2
(45) Date of Patent: Mar. 12, 2024

(54) HEARING AID CHARGING CASE

(71) Applicant: Jenniera Williamson, Brooklyn, NY (US)

(72) Inventor: Jenniera Williamson, Brooklyn, NY (US)

( * ) Notice: Subject to any disclaimer, the term of this patent is extended or adjusted under 35 U.S.C. 154(b) by 141 days.

(21) Appl. No.: 17/659,898

(22) Filed: Apr. 20, 2022

(65) Prior Publication Data

US 2023/0345190 A1    Oct. 26, 2023

(51) Int. Cl.
*H04R 25/00* (2006.01)
*H02J 7/00* (2006.01)
*H02J 50/12* (2016.01)

(52) U.S. Cl.
CPC ............ *H04R 25/65* (2013.01); *H02J 7/0044* (2013.01); *H02J 7/0047* (2013.01); *H02J 50/12* (2016.02); *H04R 25/30* (2013.01); *H04R 25/556* (2013.01); *H04R 2225/021* (2013.01); *H04R 2225/31* (2013.01)

(58) Field of Classification Search
CPC ...... H04R 25/65; H04R 25/30; H04R 25/556; H04R 2225/021; H04R 2225/31; H02J 7/0044; H02J 7/0047; H02J 50/12
See application file for complete search history.

(56) References Cited

U.S. PATENT DOCUMENTS

| 2017/0094399 A1* | 3/2017 | Chandramohan ...... H04R 5/033 |
| 2020/0266640 A1* | 8/2020 | Valenzuela ............ H02J 7/0047 |
| 2021/0345031 A1* | 11/2021 | DeMaio ............... H04R 1/1016 |

\* cited by examiner

*Primary Examiner* — Tuan D Nguyen
(74) *Attorney, Agent, or Firm* — Tatonetti IP

(57) ABSTRACT

Implemented is a hearing aid charging case that can charge hearing aids without a user having to toggle or figure out any small buttons or switches. The charging case utilizes wireless charging technology and an internal power bank, which provides the electrical current from which the power bank charges the hearing aids. The charging case comes with a protective layer inside of the upper case that provides delicate support to the hearing aids when charging. The hearing aids rest on charging pads positioned inside the lower case to receive a charge from the power bank. Each charging pad is connected to a respective indicator light informing the user of each hearing aid's charging status, such as fully charged or still charging. An outer indicator light positioned on the outside of the charging case can inform the user of the charge state of the power bank.

9 Claims, 10 Drawing Sheets

HEARING AID CHARGING CASE

BACKGROUND

Those who have hearing problems often resort to hearing aids to help detect and hear sounds. Hearing aids typically come with small switches, latches, or buttons to operate, which can be difficult to toggle for those with poor hand dexterity, such as the elderly.

SUMMARY

A hearing aid charging case is configured to charge hearing aids without a user having to toggle or figure out any small buttons or switches. The charging case utilizes wireless charging technology and an internal power bank, which provides the electrical current from which the power bank charges the hearing aids. The charging case comes with a protective layer inside of the upper case that provides delicate support to the hearing aids when charging.

The hearing aids rest on charging pads positioned inside the lower case to receive a charge from the power bank. Each charging pad is connected to a respective indicator light informing the user of each hearing aid's charging status, such as fully charged or still charging. An outer indicator light positioned on the outside of the charging case can inform the user of the charge state of the power bank, so the user can connect a USB (universal serial bus) to the power bank for recharging when necessary.

DETAILED DESCRIPTION

Figure 1:
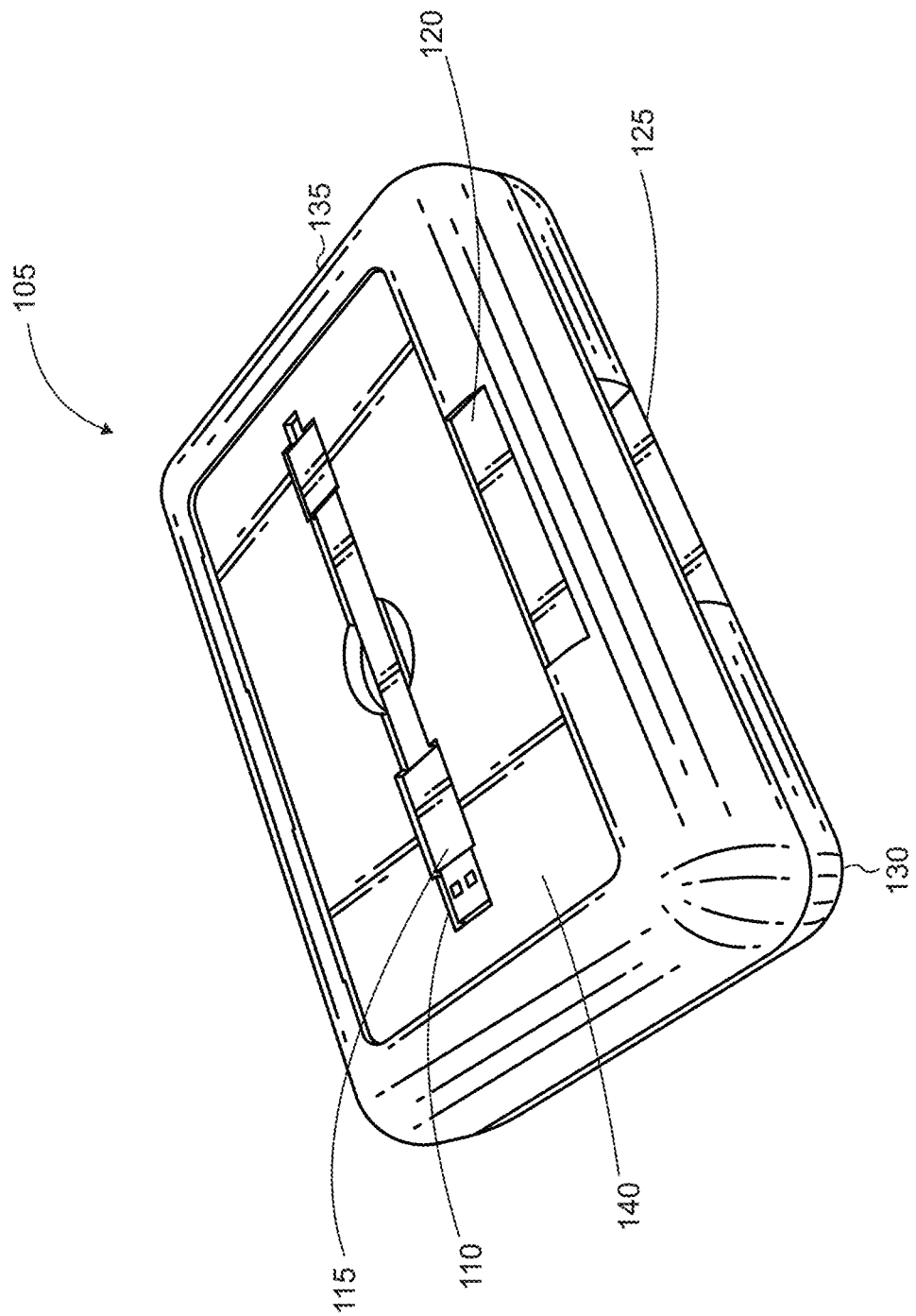
FIGS. 1 and 2 show illustrative representations of a hearing aid charging case.
Figure 2:
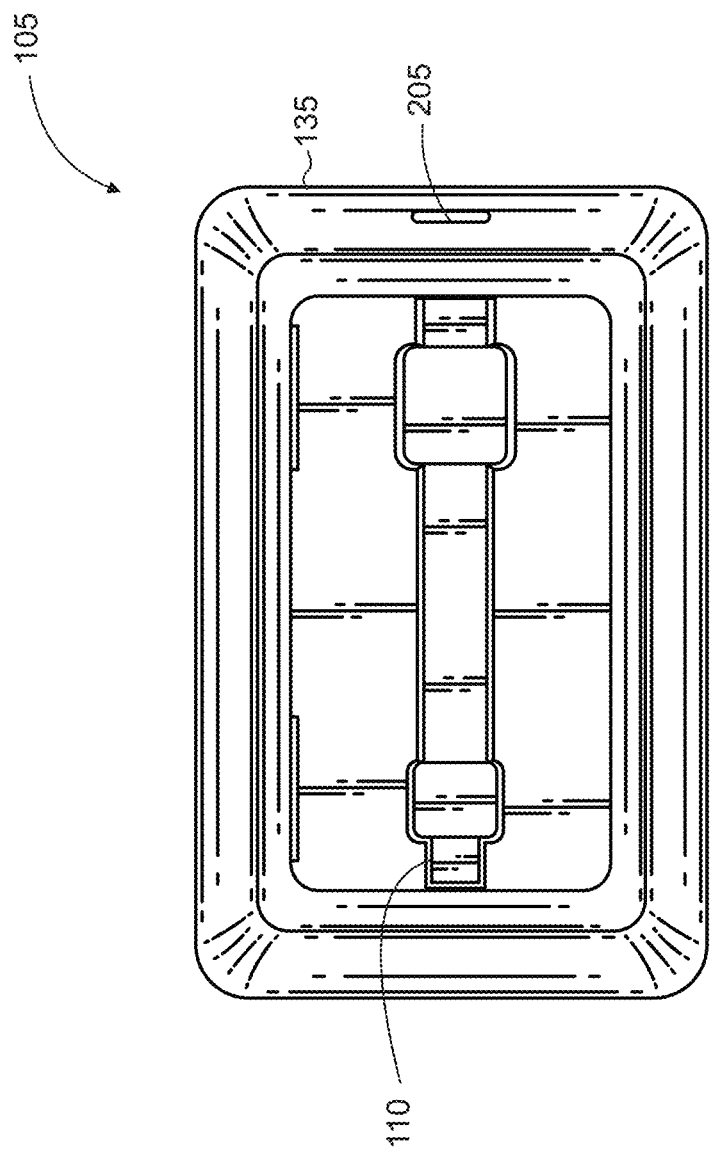

FIGS. 1 and 2 show illustrative representations of the hearing aid charging case 105. The charging case includes a lower case 130 and an upper case 135 that open and close about a hinge (not shown). A user can open the upper case from the bottom case by reaching for handle 125 and prying the upper case upward from the lower case. For example, the upper and lower case may be a press-fit mechanism that opens and closes with sufficient pressure.

The upper case 135 includes some additional components that can complement some of the charging case's functionality. For example, the upper case includes a top lid 140, inside which is a recess 110 that can store a USB (universal serial bus) cable 115. The upper case also includes an outside indicator light 205 that can change color to inform the user when the charging case's power supply is running low or is fully charged. For example, the indicator light can flash or shine red for charging or green for fully or sufficiently charged for use.

Figure 3:
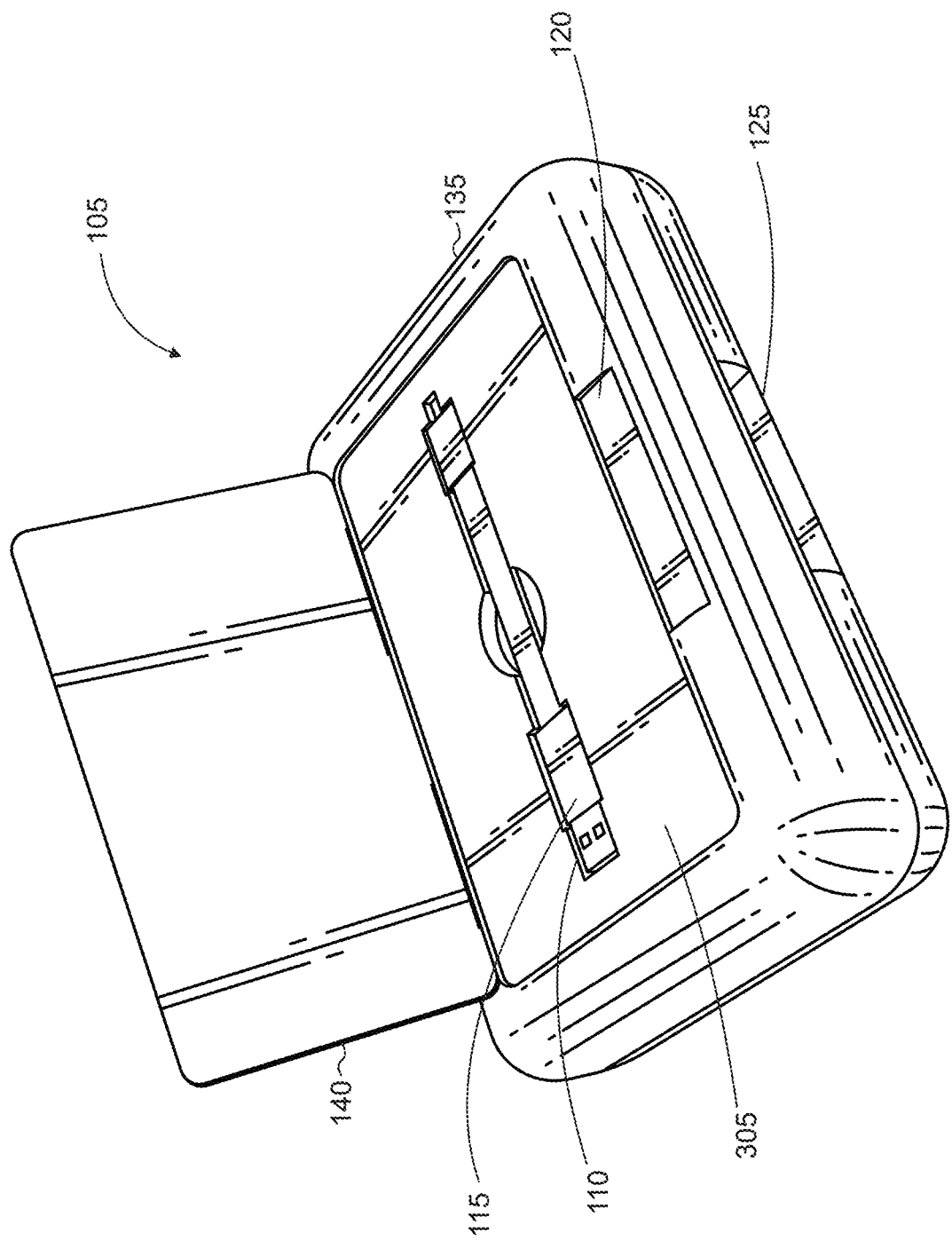
FIG. 3 shows an illustrative representation in which a top lid on the charging case is lifted to expose a charging cable.

FIG. 3 shows an illustrative representation in which the top lid 140 has been lifted, and the recess 110 and USB cable 115 stored therein are exposed for use. The user can remove the USB charging cable and plug it into a port on the charging case 105 when, for example, the power bank that provides the charge to the hearing aids is low.

Figure 4:
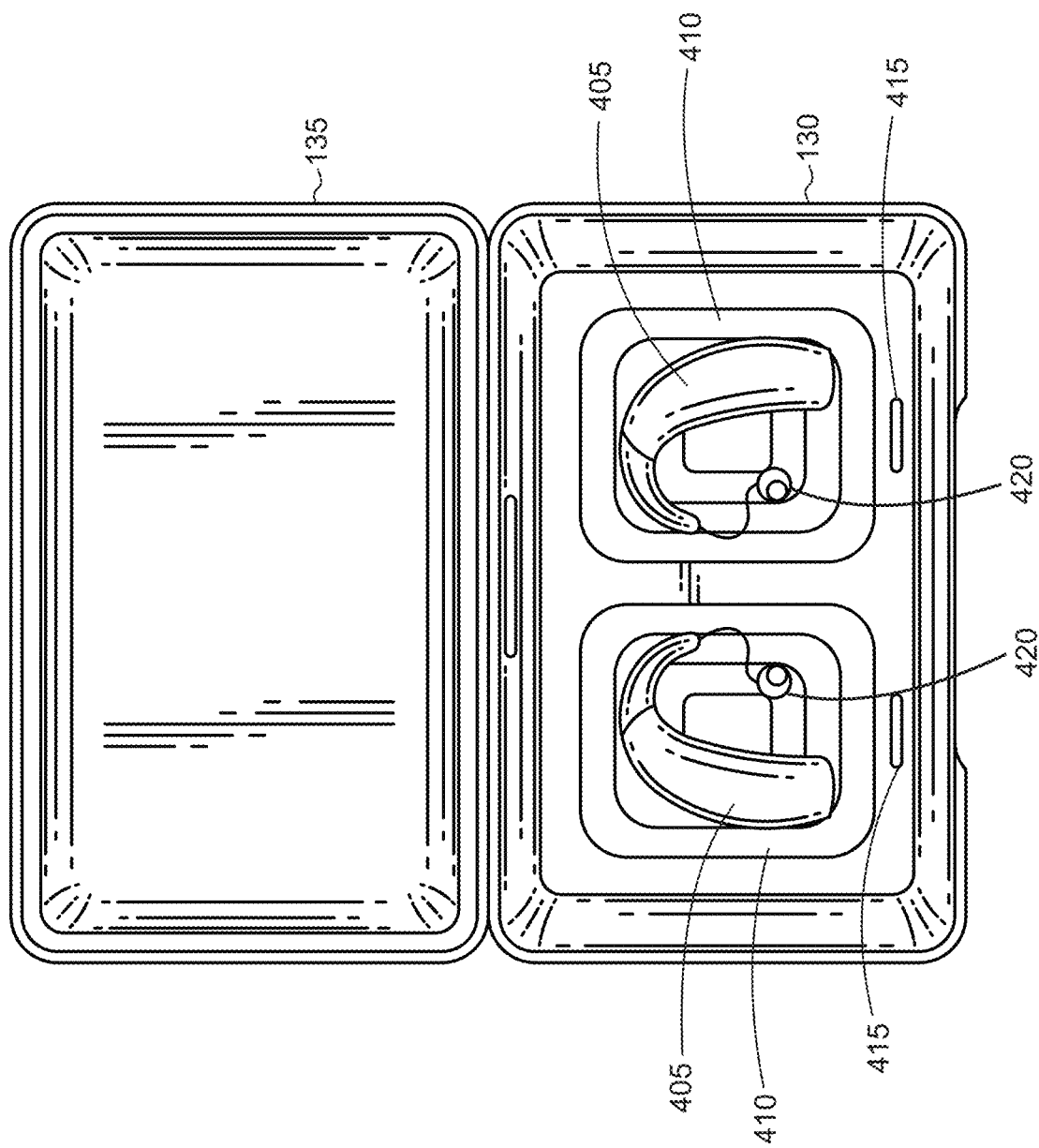
FIG. 4 shows an illustrative representation in which an upper case is lifted about a hinge to expose the interior of the charging case.
Figure 5:
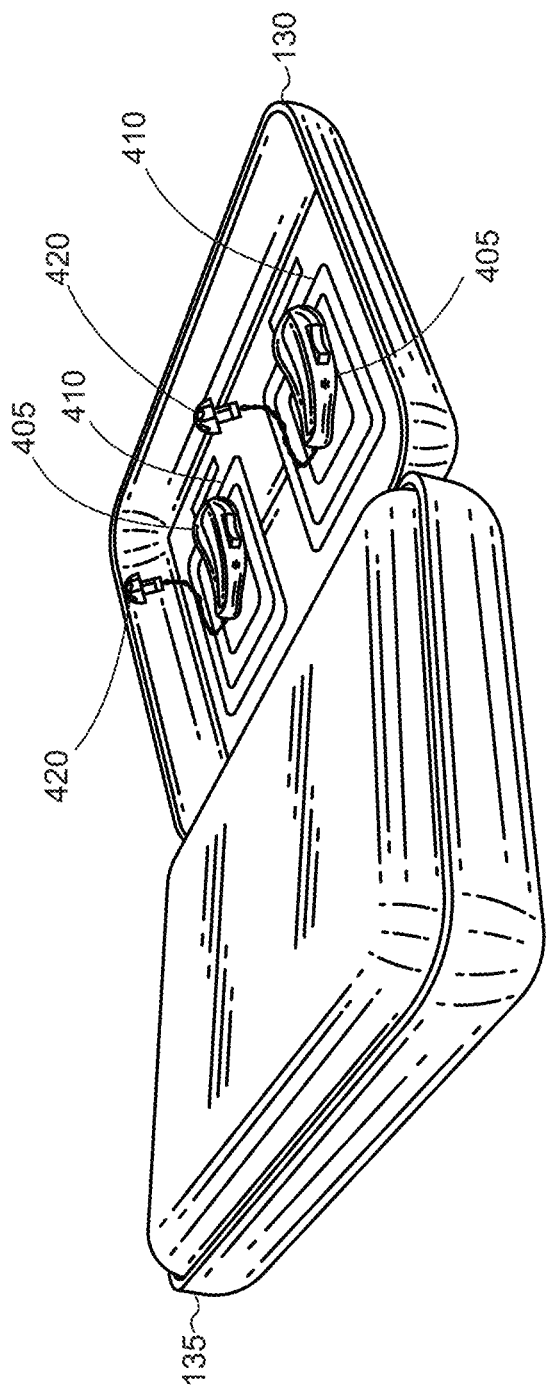
FIGS. 5 and 6 show illustrative representations of hearing aids wirelessly charging inside the charging case.
Figure 6:
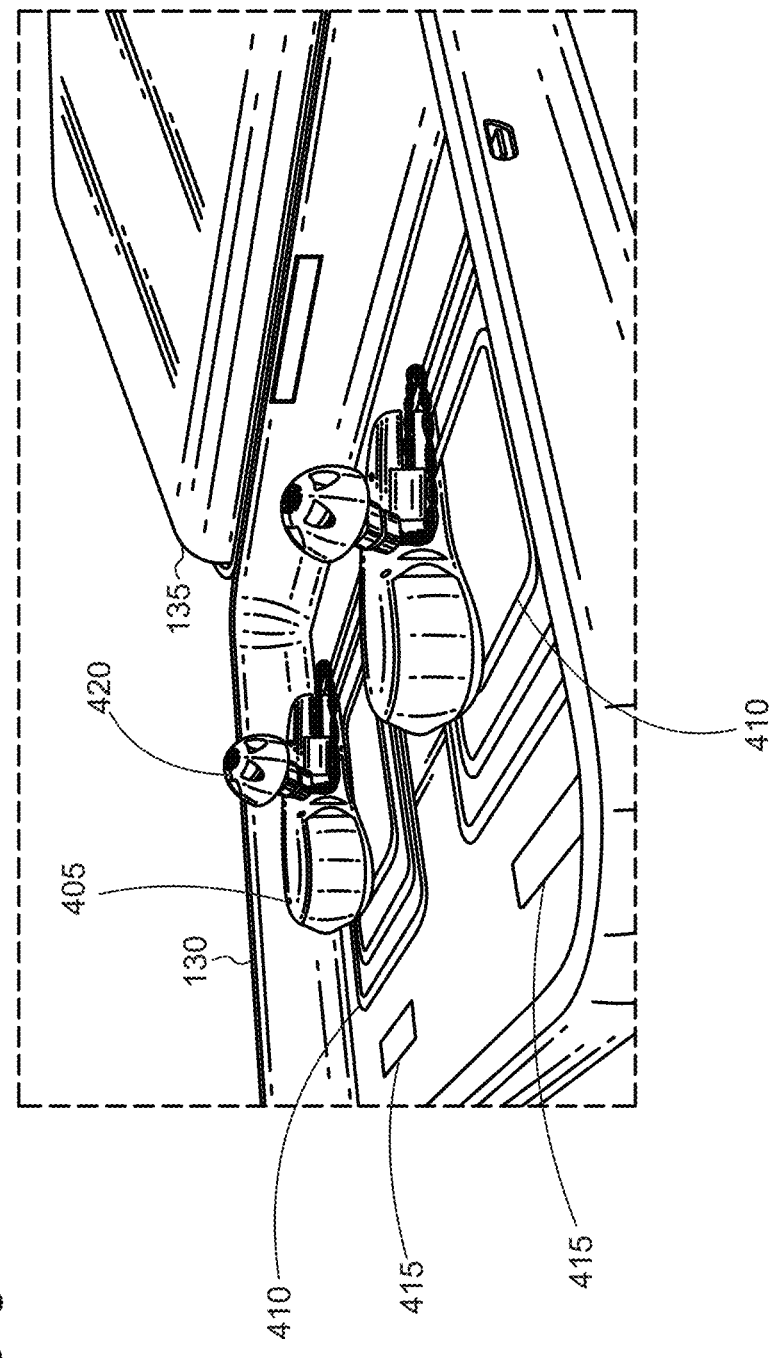

FIGS. 4-6 show illustrative representations in which the charging case 105 is opened, such that the upper case 135 has been lifted from the lower case 130 about the hinge. The hearing aids 405 are respectfully resting on wireless charging pads 410 inside the charging case. The hearing aids 405 may be the portion that receives and stores the electric charge, and the earbuds 420 are the components placed inside the user's ears when in use. Each charging pad is connected to its own indicator light 415 to inform the user when the hearing aids are fully charged or are charging.

In typical implementations, the charging pads leverage wireless charging technology to charge the hearing aids. For example, the charging pads may transfer energy to a receiver on each hearing aid via electromagnetic induction, in which the charger generates an alternating electromagnetic field which the receiver on the hearing aids converts back into electricity form for charging its internal battery. Other charging mechanisms are also possible, such as using pins on the charging pads and contact points on the hearing aids. Plugin devices may also be utilized, such as USB connectors, male-female connections, etc.

Figure 7:
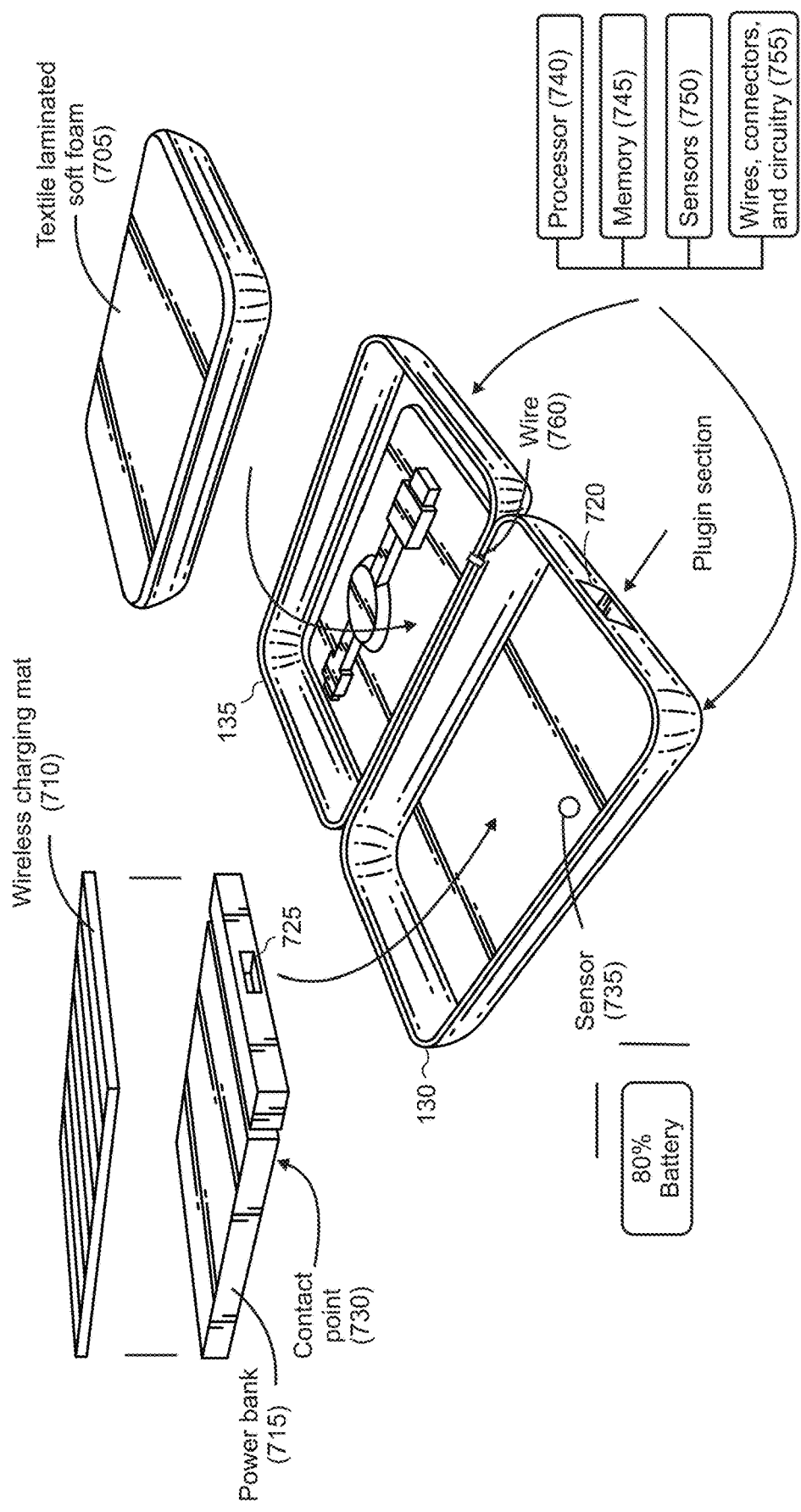
FIG. 7 shows an illustrative exploded view of the components of the charging case.

FIG. 7 shows an illustrative exploded representation of the charging case's components. The charging case 105 is configured with a lower case 130 and an upper case 135 that can open and close about a hinge. When charging, a textile laminated soft foam layer 705 is attached and secured to the inside of the upper case 135 to provide delicate support to the hearing aids. On the other side, a power bank 715 is attached and secured inside the lower case 130 to provide the electrical current to charge the hearing aids. The wireless charging mat 710, which includes the charging pads 410, is positioned adjacent to the power bank. The charging mat may be connected to the power bank via a wire so the charging mat can pass an electric current from the power bank to the hearing aids.

The power bank includes a port 725, such as a USB port, to receive a charging cable so the power bank can be recharged for multiple uses. For example, when the components are fully assembled, and the power bank 715 is positioned at the bottom of the lower case 130, the port 725 aligns with the opening 720 so that the port is exposed for future charging.

Furthermore, the inside surface of the lower case 130 may have a sensor 735 that comes into contact with a contact point 730 on the bottom of the power bank. The sensor can detect a battery level of the power bank so that the outside indicator light 205 (FIG. 2) informs the user of the power bank's status. As shown in FIG. 7, the sensor detects that the power bank has 80% battery left. The sensors for the power bank and the hearing aids may be an electronic battery sensor (EBS) capable of detecting the battery life, but other sensors are also possible.

For example, the indicator light may shine red for low, green for fully or charged beyond some threshold (e.g., 75%), and yellow for some range (e.g., between 10-74% charged). A wire may be routed from the sensor to an internal processor 740 that communicates and controls the indicator light's status/color. For example, a wire may be routed through the interiors of the lower case 130 and upper case 135 and also through the hinge—as shown by wire 760—so that the lower- and upper-case components can communicate. Depending on the implementation, the various electrical operational components, such as the processor 740, memory 745, and wires, connectors, and circuitry 755, may be positioned on the lower or upper case, as shown in FIG. 7. Furthermore, the wireless mat may have its own internal processors and memory in order to control the indicator lights status responsive to the sensors on the wireless charging pads 410 (FIG. 4). In this regard, a wire may connect the pad sensors to an internal processor, which is connected to the indicator lights 415 via a wire or other electrical contact.

Figure 8:
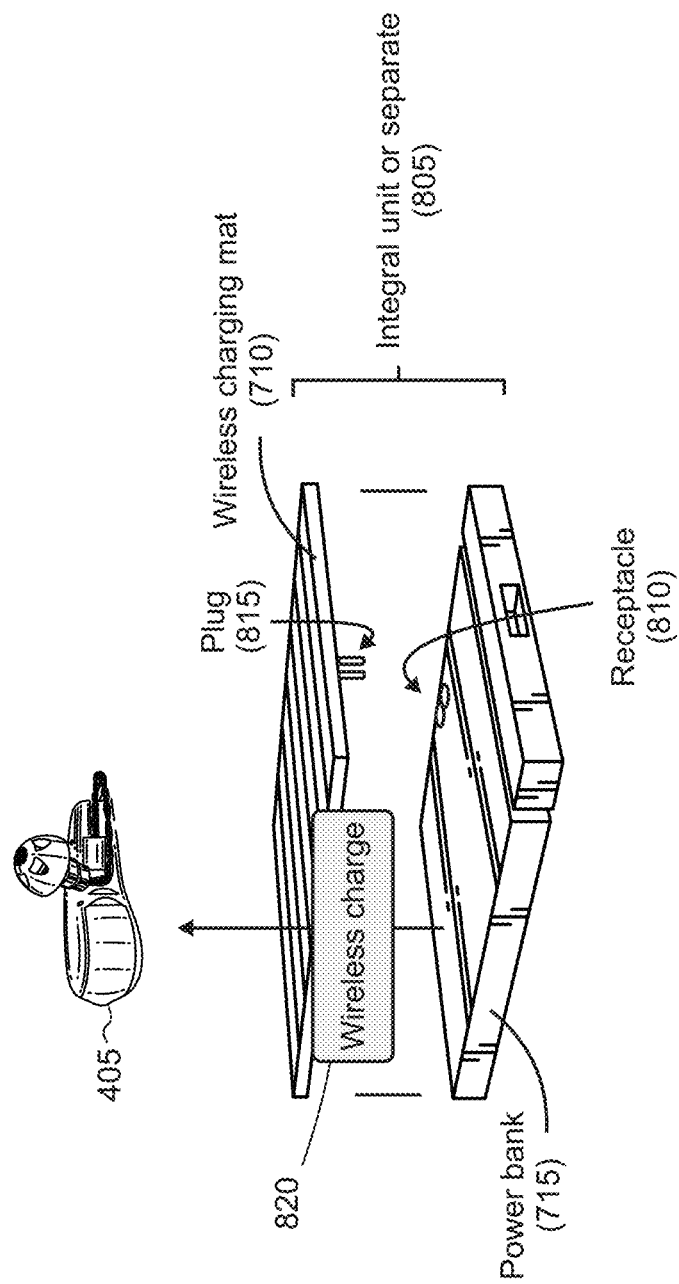
FIG. 8 shows an illustrative representation of the charging components transferring a charge to the hearing aids.

FIG. 8 shows an illustrative representation in which a wireless charge 820 is passed from the power bank 715, through the wireless charging mat 710, and to the hearing aid 405. The charging mat may be configured with electrical contacts, such as plug 815, which connects to a receptacle 810 on the power bank. Using this connection point, the power bank can transfer its energy to the wireless charging mat, passing the charge to the hearing aids. While the diagram shows these components as separate, the charging mat and power bank may be a single integral unit or separate, as representatively shown by numeral 805. For example, as a single integral unit, the charging mat may be the top part of the power bank, and the rest of its components may be in a single housing.

Figure 9:
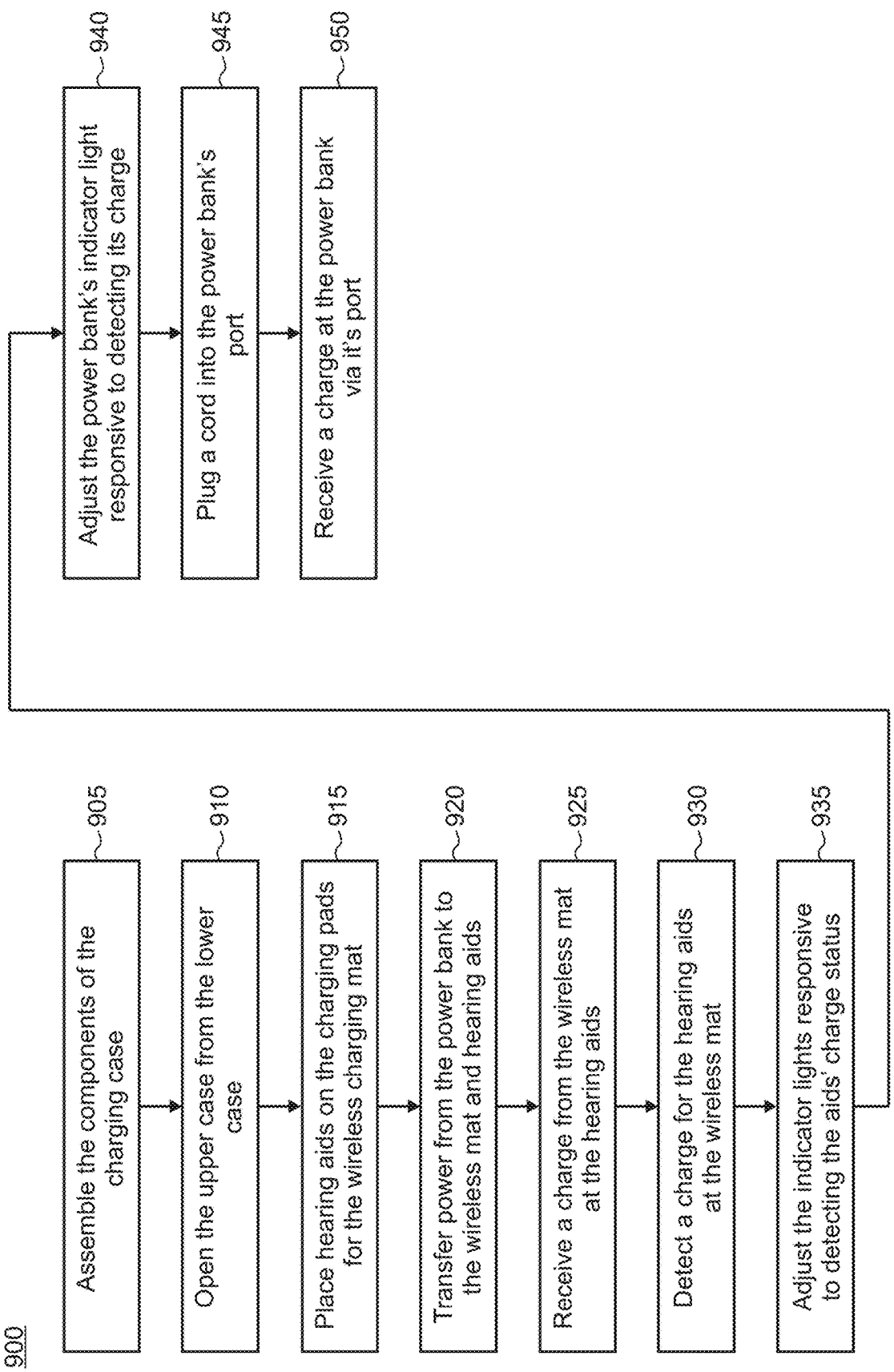
FIG. 9 shows an illustrative flowchart of the charging case's operations.

FIG. 9 shows an illustrative representation of a process 900 that may be implemented by the components discussed herein, including the charging case and hearing aids, which may or may not be influenced by user action. Although a specific order of steps is shown, it should be understood that the process is exemplary only and other arrangements of the steps are possible. In step 905, the components of the charging case are assembled (FIG. 7). In step 910, the upper case is opened, about a hinge, from the lower case. In step 915, the hearing aids are placed on the charging pads for the wireless charging mat. In step 920, power from the power bank is transferred to the wireless mat and then to the hearing aids from the mat. In step 925, the wireless mat receives the charge from the power bank to transfer the mat's power to the hearing aids. In step 930, charges from the hearing aids at the wireless mat are detected by sensors. In step 935, the indicator lights inside the charging case are responsively adjusted to the detected status. In step 940, the power bank's indicator light is adjusted responsive to a sensor detected within the charging case. In step 945, a cord is plugged into the power bank's port. In step 950, the power bank receives a charge at the port.

Figure 10:
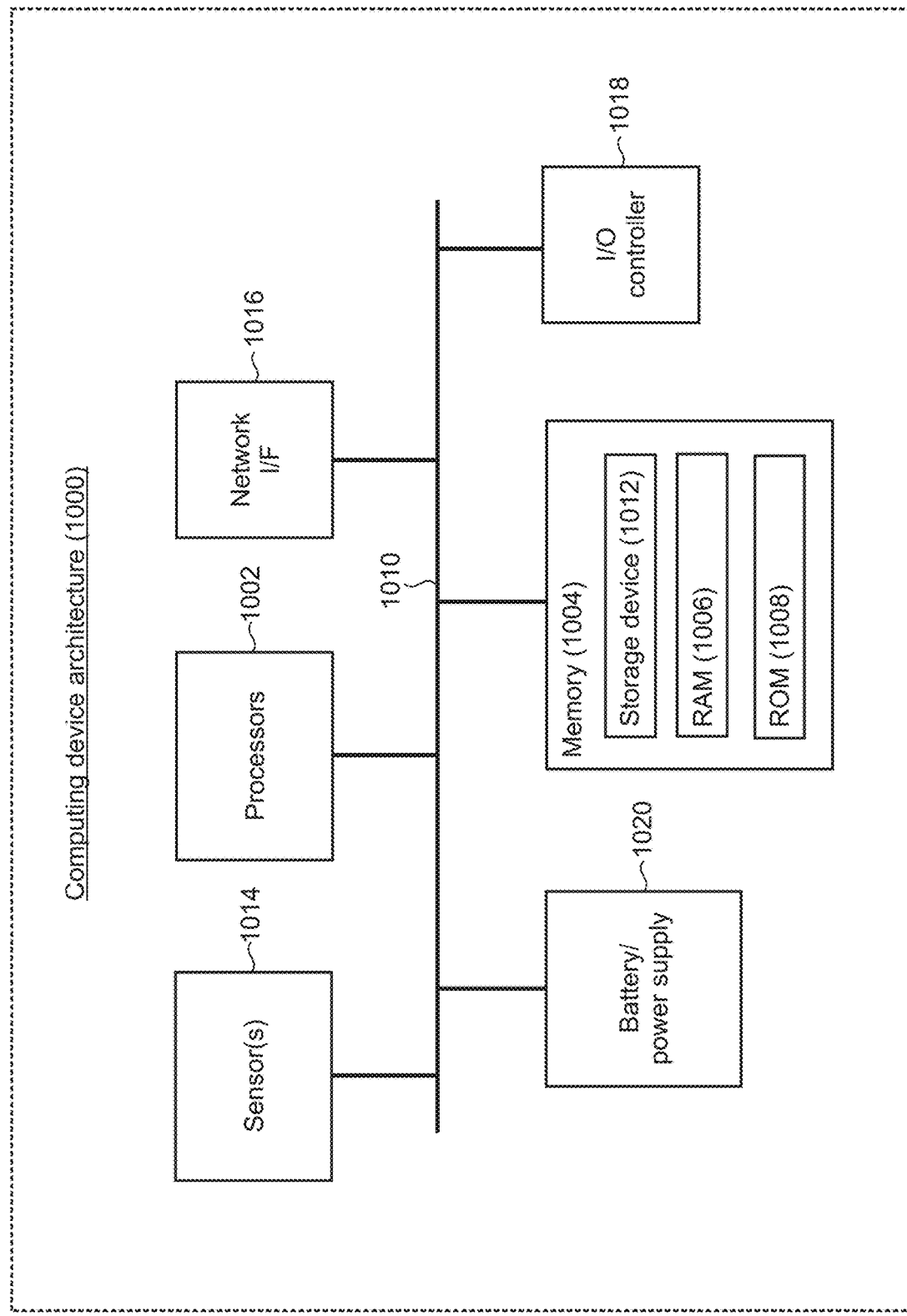
FIG. 10 shows an illustrative computer system of the hearing aid charging case or hearing aids.

FIG. 10 shows an illustrative architecture 1000 for a device, such as the hearing aid case or hearing aids capable of executing the various features described herein. The architecture 1000 illustrated in FIG. 10 includes one or more processors 1002 (e.g., central processing unit, dedicated AI chip, graphics processing unit, etc.), a system memory 1004, including RAM (random access memory) 1006, ROM (read-only memory) 1008, and long-term storage devices 1012. The system bus 1010 operatively and functionally couples the components in the architecture 1000. A basic input/output system containing the basic routines that help to transfer information between elements within the architecture 1000, such as during startup, is typically stored in the ROM 1008. The architecture 1000 further includes a long-term storage device 1012 for storing software code or other computer-executed code that is utilized to implement applications, the file system, and the operating system. The storage device 1012 is connected to the processor 1002 through a storage controller (not shown) connected to the bus 1010. The storage device 1012 and its associated computer-readable storage media provide non-volatile storage for the architecture 1000. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1000, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1000.

According to various embodiments, the architecture 1000 may operate in a networked environment using logical connections to remote computers through a network. The architecture 1000 may connect to the network through a network interface unit 1016 connected to the bus 1010. It may be appreciated that the network interface unit 1016 also may be utilized to connect to other types of networks and remote computer systems. The architecture 1000 also may include an input/output controller 1018 for receiving and processing input from a number of other devices, including a keyboard, mouse, touchpad, touchscreen, control devices such as buttons and switches or electronic stylus (not shown in FIG. 10). Similarly, the input/output controller 1018 may provide output to a display screen, user interface, a printer, or other type of output device (also not shown in FIG. 10).

It may be appreciated that any software components described herein may, when loaded into the processor 1002 and executed, transform the processor 1002 and the overall architecture 1000 from a general-purpose computing system into a special-purpose computing system customized to facilitate the functionality presented herein. The processor 1002 may be constructed from any number of transistors or other discrete circuit elements, which may individually or collectively assume any number of states. More specifically, the processor 1002 may operate as a finite-state machine, in response to executable instructions contained within the software modules disclosed herein. These computer-executable instructions may transform the processor 1002 by specifying how the processor 1002 transitions between states, thereby transforming the transistors or other discrete hardware elements constituting the processor 1002.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like.

For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1000 in order to store and execute the software components presented herein. It also may be appreciated that the architecture 1000 may include other types of computing devices, including wearable devices, handheld computers, embedded computer systems, smartphones, PDAs, and other types of computing devices known to those skilled in the art. It is also contemplated that the architecture 1000 may not include all of the components shown in FIG. 10, may include other components that are not explicitly shown in FIG. 10, or may utilize an architecture completely different from that shown in FIG. 10.

Various exemplary embodiments are discussed herein. In one embodiment, disclosed is a charging case for hearing aids, comprising: a lower case; an upper case that is connected to the lower case via a hinge, such that the top and lower cases open and close relative to each other about the hinge; a protective layer positioned and secured to an inside of the upper case; a power bank that is secured to an inside of the lower case; and a wireless charging mat that is positioned adjacent to the power bank and which receives power from the power bank, wherein the wireless charging mat includes charging points configured to wirelessly charge hearing aids.

In another example, the protective layer is at least partially comprised of foam. As another example, further comprising indicator lights on the wireless charging mat that independently change color when a respective hearing aid is fully charged or charging. In another example, further comprising a sensor that detects a battery life of the hearing aids. As another example, further comprising a sensor on an interior portion of the lower case that detects a battery life of the power bank. In another example, further comprising an exterior indicator light that changes responsive to the detected battery life of the power bank. As another example, further comprising a port for charging the power bank. As a further example, wherein the power bank includes a connector to which the wireless mat connects for transferring the power from the power bank to the wireless charging mat. As another example, the wireless charging mat is a single integral unit with the power bank.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A charging case for hearing aids, comprising:
a lower case;
an upper case that is connected to the lower case via a hinge, such that the top and lower cases open and close relative to each other about the hinge;
a protective layer positioned and secured to an inside of the upper case;
a power bank that is secured to an inside of the lower case; and
a wireless charging mat that is positioned adjacent to the power bank and which receives power from the power bank, wherein the wireless charging mat includes charging points configured to wirelessly charge hearing aids.

2. The charging case of claim 1, wherein the protective layer is at least partially comprised of foam.

3. The charging case of claim 1, further comprising indicator lights on the wireless charging mat that independently change color when a respective hearing aid is fully charged or charging.

4. The charging case of claim 3, further comprising a sensor that detects a battery life of the hearing aids.

5. The charging case of claim 4, further comprising a sensor on an interior portion of the lower case that detects a battery life of the power bank.

6. The charging case of claim 5, further comprising an exterior indicator light that changes responsive to the detected battery life of the power bank.

7. The charging case of claim 1, further comprising a port for charging the power bank.

8. The charging case of claim 1, wherein the power bank includes a connector to which the wireless mat connects for transferring the power from the power bank to the wireless charging mat.

9. The charging case of claim 1, wherein the wireless charging mat is a single integral unit with the power bank.

* * * * *